United States Patent
Schneider et al.

(10) Patent No.: US 11,505,729 B2
(45) Date of Patent: Nov. 22, 2022

(54) MATERIALS FOR USE AS ADHESIVE AND FOR SURFACE SEALING

(71) Applicant: EPG (ENGINEERED NANOPRODUCTS GERMANY) AG, Griesheim (DE)

(72) Inventors: Heike Schneider, Mandelbachtal (DE); Stefan Pfeifer, Oer-Erkenschwick (DE); Ralf Kockler, Rehlingen/Siersburg (DE); Klaus Endres, Homburg (DE)

(73) Assignee: EPG (ENGINEERED NANOPRODUCTS GERMANY) AG, Griesheim (DE)

( * ) Notice: Subject to any disclaimer, the term of this patent is extended or adjusted under 35 U.S.C. 154(b) by 51 days.

(21) Appl. No.: 16/083,153

(22) PCT Filed: Mar. 10, 2017

(86) PCT No.: PCT/EP2017/055681
§ 371 (c)(1),
(2) Date: Sep. 7, 2018

(87) PCT Pub. No.: WO2017/153576
PCT Pub. Date: Sep. 14, 2017

(65) Prior Publication Data
US 2019/0023955 A1    Jan. 24, 2019

(30) Foreign Application Priority Data
Mar. 11, 2016 (EP) .................... 16159974

(51) Int. Cl.
| C09J 179/08 | (2006.01) |
|---|---|
| C09J 187/00 | (2006.01) |
| C08K 3/16 | (2006.01) |
| C08K 5/00 | (2006.01) |
| C09J 11/04 | (2006.01) |
| C09J 11/06 | (2006.01) |
| C09J 11/08 | (2006.01) |
| C09J 163/00 | (2006.01) |
| C09J 177/00 | (2006.01) |
| C09J 183/04 | (2006.01) |

(52) U.S. Cl.
CPC .............. *C09J 179/08* (2013.01); *C08K 3/16* (2013.01); *C08K 5/0025* (2013.01); *C09J 11/04* (2013.01); *C09J 11/06* (2013.01); *C09J 11/08* (2013.01); *C09J 163/00* (2013.01); *C09J 177/00* (2013.01); *C09J 183/04* (2013.01); *C09J 187/00* (2013.01)

(58) Field of Classification Search
CPC ........ C09J 179/08; C09J 187/00; C09J 11/04; C09J 11/06; C09J 11/08; C09J 163/00; C09J 177/00; C09J 183/04; C08K 3/16; C08K 5/025
See application file for complete search history.

(56) References Cited

U.S. PATENT DOCUMENTS

| 5,102,960 A * | 4/1992 | Imai ..................... C08G 59/306 |
|---|---|---|
| | | 525/476 |
| 6,432,191 B2 * | 8/2002 | Schutt ..................... C09D 4/00 |
| | | 106/287.15 |
| 8,038,970 B2 | 10/2011 | Andrews |
| 2010/0204037 A1 * | 8/2010 | Gensler .................... C09D 7/67 |
| | | 502/159 |
| 2010/0311901 A1 * | 12/2010 | Kanakarajan .......... H05K 3/386 |
| | | 264/80 |
| 2020/0181396 A1 * | 6/2020 | Lendlein ................... D01F 6/92 |

FOREIGN PATENT DOCUMENTS

| EP | 1190009 | 4/2008 |
|---|---|---|
| JP | H0578622 | 3/1993 |
| JP | 2012251087 | 12/2012 |

OTHER PUBLICATIONS

Beresnev V. M. et al., "Adhesion strength of nanocomposite coatings Zr—Ti—Si—N obtained by vacuum arc method", FIP PSE 2010 vol. 8 Nr. 4 (Abstract).

* cited by examiner

*Primary Examiner* — Patrick D Niland
(74) *Attorney, Agent, or Firm* — Cozen O'Connor

(57) ABSTRACT

Materials from the group consisting of
a) one or more hybrid materials containing an organic polymer from the group of the polyamides, polyimides and epoxy resins and an inorganic oligo- or polymer from the group of the oligo- and polysiloxanes and heterocondensates of Si with Ti, Zr and/or Al, wherein the organic and the inorganic component are covalently bound to one another, in combination with one or more inorganic sols based on silyl alkoxylates and/or titanium alkoxylates, wherein hybrid material and inorganic sol are crosslinked,
b) one or more hybrid materials containing an organic polymer from the group of the polyamides, polyimides and epoxy resins and an inorganic oligo- or polymer from the group of the oligo- and polysiloxanes and heterocondensates of Si with Ti, Zr and/or Al, wherein the organic and the inorganic component are covalently bound to one another,
c) one or more inorganic sols based on silyl alkoxylates and/or titanium alkoxylates and
d) one or more polyamides, polyimides and/or epoxy resins mixed with oxidic and/or non-oxidic metal and/or metalloid particles, preferably from the group of the oxides, nitrides, carbides and mixtures thereof,
are suitable as adhesive for the bonding of metals, plastics, concrete and/or ceramics.

17 Claims, No Drawings

MATERIALS FOR USE AS ADHESIVE AND FOR SURFACE SEALING

CROSS REFERENCE TO RELATED APPLICATIONS

This application is a U.S. National Stage of International Application No. PCT/EP2017/055681, filed Mar. 10, 2017, which claims the benefit of European patent Application No. 16159974.1, filed Mar. 11, 2016, the entire contents of which are incorporated herein by reference.

The invention relates to the use of heat resistant materials as adhesives, certain compositions of hybrid materials and inorganic sols and use thereof as sealing materials and corrosion protection layers.

Metallic components and materials are used in the industrial field and also in the private household in many different fields in which protection against corrosion is to be achieved or the ageing process of the workpiece prevented or retarded. As well as to the most diverse weather conditions, these components are exposed to environments which represent a particularly demanding chemical and physical stress for the coating materials and materials used. Particularly in presence of corrosive media and in combination with alternating thermal stresses or high pressure stresses, an increased requirements profile is set for the materials used.

Independently of their use location and the particular application, unprotected medium-carrying systems are subject to corrosion processes which damage the material used and are attended by high repair expenditure. The corrosion of the pipe systems leads annually to high financial losses which arise through repairs and maintenance works. Particularly with pipe systems which carry chemical compounds harmful to nature and the environment, corrosion can lead to immense economic damage occurring in addition to financial damage.

In the field of the bonding of metallic and other materials, a great variety of polymer-type adhesive systems are used. In this, the purpose is to bond workpieces to one another temporarily or permanently. The currently available adhesive classes distinguish between non-curing adhesives, physically curing adhesives and chemically curing adhesives. To the class of the non-curing adhesives or the bonding adhesives also described as binders, are assigned in particular high viscosity polymer systems which are applied as mostly solvent-free low viscosity systems and brought into the adhesive state by means of UV or thermally. Such materials used for example in the aviation industry display good strength, but are only thermally stable up to ca. 200-220° C.

The class of the physically curing adhesives includes plastisols, hot-melt adhesives, solvent-based adhesives and dispersions. These are on the on hand solvent-containing systems (contact adhesives), which are macromolecular but chemically not crosslinked. The viscosity of the materials is lowered by addition of solvent and the contact adhesives are applied onto both adherends. The plastisols are in particular used in vehicle construction and these adhesives are polymers dispersed in solvents, such as polyvinyl chloride. Just like the hot-melt adhesives, depending on the application field, these adhesives also show good adhesive properties, but the thermal stability lies in the range from only 120 to 150° C.

The chemically curing adhesives include the one-component (low molecular weight, plasticizing substances based on phenol or epoxy resins, polybenzimidazoles or polyimides), the two-component (polyester, cold-curing epoxy resins, acrylate adhesives and urethanes) and the cold-curing materials (methacrylates and silicone resins). These adhesives also show good adhesive properties and to some extent high deformation strengths. However, here also the maximum temperature resistance lies in the region of 200° C.

From the prior art, it is clear that many compositions are available for the bonding of metallic materials. However, no materials are known which have both a high temperature resistance >250° C. and also can be used as adhesive for example for the production of laminate structures. At the same time, it is not known that the adhesive systems can also be used as corrosion protection layers or sealing materials The invention is therefore based on the problem of providing materials which are suitable as adhesives, in particular for metals, and have a high temperature resistance, preferably >250° C.

Surprisingly, it was now found that certain organic, inorganic and hybrid materials are suitable as adhesives, in particular as metal-metal adhesives. Explicitly, it was established that these materials can be used for thermally demanding applications, in which in particular two metal workpieces or one metal workpiece are to be permanently bonded to a plastic component.

A subject of the invention is therefore the use of one or more materials from the group consisting of
a) one or more hybrid materials containing an organic polymer from the group of the polyamides, polyimides and epoxy resins and an inorganic oligo- or polymer from the group of the oligo- and polysiloxanes and heterocondensates of Si with Ti, Zr and/or Al, wherein the organic and the inorganic component are covalently bound to one another, in combination with one or more inorganic sols based on silyl alkoxylates and/or titanium alkoxylates, wherein hybrid material and inorganic sol are crosslinked,
b) one or more hybrid materials containing an organic polymer from the group of the polyamides, polyimides and epoxy resins and an inorganic oligo- or polymer from the group of the oligo- and polysiloxanes and heterocondensates of Si with Ti, Zr and/or Al, wherein the organic and the inorganic component are covalently bound to one another,
c) one or more inorganic sols based on silyl alkoxylates and/or titanium alkoxylates and
d) one or more polyamides, polyimides and/or epoxy resins mixed with oxidic and/or non-oxidic metal and/or metalloid particles, preferably from the group of the oxides, nitrides, carbides and mixtures thereof,
as adhesive for the bonding of metals, plastics, concrete and/or ceramics.

A further subject of the invention is a method for the bonding of two substrates with metal, plastic, concrete and/or ceramic surfaces, wherein onto at least one metal, plastic, concrete or ceramic surface of at least one substrate, one or more adhesives from the group consisting of
a) one or more hybrid materials containing an organic polymer from the group of the polyamides, polyimides and epoxy resins and an inorganic oligo- or polymer from the group of the oligo- and polysiloxanes and heterocondensates of Si with Ti, Zr and/or Al, wherein the organic and the inorganic component are covalently bound to one another, in combination with one or more inorganic sols based on silyl alkoxylates and/or titanium alkoxylates, wherein hybrid material and inorganic sol are crosslinked,
b) one or more hybrid materials containing an organic polymer from the group of the polyamides, polyimides and epoxy resins and an inorganic oligo- or polymer from the group of the oligo- and polysiloxanes and heterocondensates of Si with Ti, Zr and/or Al, wherein the organic and the inorganic component are covalently bound to one another, c) one or more inorganic sols based on silyl alkoxylates and/or titanium alkoxylates and d) one or more polyamides, polyimides and/or epoxy resins mixed with oxidic and/or non-oxidic metal and/or metalloid particles, preferably from the group of the oxides, nitrides, carbides and mixtures thereof, are applied and thereafter the two substrates are joined.

Some of the materials used according to the invention are known and some are novel. Also a subject of the invention therefore is a composition containing aa) a hybrid material, containing an organic polymer from the group of the polyamides, polyimides and epoxy resins and, covalently bound thereto, an inorganic oligo- or polymer from the group of the oligo- or polysiloxanes or corresponding heterocondensates of Si with Ti, Zr and/or Al, and ab) an inorganic sol based on silyl alkoxylates and/or titanium alkoxylates, wherein hybrid material and sol are crosslinked.

As well as for use as an adhesive, the compositions according to the invention are also outstandingly suitable as sealing materials and corrosion protection layers.

Also a subject of the invention therefore is the use of a composition according to the invention as sealing material and/or corrosion protection layer.

The materials used according to the invention show very good adhesive properties and outstanding temperature stability of the adhesive layer of >250° C. Further, compositions according to the invention are especially suitable as sealing and corrosion protection layers. Furthermore, lined pipes can be perforated for the production of T-pieces, without the adhesive losing performance.

Materials

In a preferred embodiment, the material used as adhesive is a hybrid material b) containing an organic polymer from the group of the polyamides, polyimides and epoxy resins, which have end or side groups reactive towards the inorganic segments, and an inorganic oligo- or polymer from the group of the oligo- and polysiloxanes and heterocondensates of Si with Ti, Zr and/or Al, wherein the organic and the inorganic component are covalently bound to one another.

According to the invention as organic polymers in principle all polyamides, polyimides and epoxy resins, which have a temperature stability of at least 250° C. and have functional end and/or side groups which are suitable for covalent bonding to the inorganic component, such as epoxy, OH or NH functions, are suitable.

The polymers used must additionally have free functional groups which enable curing during bonding, for example terminal epoxy groups.

As polyamides, aliphatic polyamides, for example from hexamethylenediamine and adipic acid, partly aromatic polyamides, for example from hexamethylenediamine and terephthalic acid, and aromatic polyamides, for example from phenylenediamine and terephthalic acid, wherein aromatic polyamides are preferred, are suitable. As well as homopolyamides, copolyamides from different monomers are preferred.

Preferred monomers for diimides are di- or higher amines and di- and trianhydrides. Particularly preferred are:

1. diamines: $H_2N-R-NH_2$, wherein R can be alkyl and/or aryl and which can also contain functional groups such as SH or $CF_2$, wherein $NH_2$ groups are at least 3 C atoms apart;

2. anhydrides of di- or higher carboxylic acids such as maleic anhydride, succinic anhydride, diglycolic anhydride, glutaric anhydride, dianhydrides and trianhydrides, for example dianhydrides, particularly preferably pyromellitic dianhydride, diethylene-triaminepentaacetic acid, 1,4,5,8-naphthalenetetracarboxylic anhydride, cyclobutane-1,2,3,4-tetracarboxylic anhydrides, benzophenonetetracarboxylic dianhydride, 3,3',4,4'-biphenyltetracarboxylic dianhydride, cis-1,2,3,4-cyclopentanetetracarboxylic dianhydride and tetrahydrofuran-2,3,4,5-tetracarboxyloc dianhydride, trianhydrides: mellitic trianhydride, decacyclene trianhydride.

In a particularly preferred embodiment, the polyimide is formed from the monomers 4,4'-bis(3-aminophenoxy)diphenylsulphone and benzophenonetetracarboxylic dianhydride.

In a further preferred embodiment, the inorganically modified polyimide (which can also to some extent contain amide structural units) is obtained by reaction of one or more di- or trianhydrides with amino-functionalized alkoxysilanes. For control of the chain length and branching, a certain proportion of anhydrides of monocarboxylic acids, such as acetic anhydride can be added during this.

Particularly preferable are the materials described in the German patent application DE 10 2011 001 833 A1. These are bis(alkoxyalkylsilylalkyl)imide/bis(alkoxyalkylsilylalkyl)amide silyl units with the following structure:

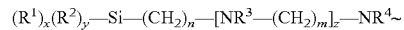

with $R^1$=alkoxyl, preferably linear or branched $C_1$-$C_6$ alkoxyl, still more preferably ethoxy, methoxy, isopropyloxy or propyloxy $R^2$=alkyl, preferably linear or branched $C_1$-$C_6$ alkyl, still more preferably methyl, ethyl, propyl or isopropyl, x=1-3, y=3-x n=1 to 5, preferably 2 or 3 z=0 to 5, preferably 0, 1, or 2

$R^3$=H or trimethylsilyl, wherein for the case that z is >1, each $R^3$ of each unit can be selected independently of one another, m=1 to 5, preferably 2 or 3, wherein for the case that z is >1, each m of each unit can be selected independently of one another, $R^4$=H, trimethylsilyl or carboxyl (in the case of imines)

The term "silyl unit" here means a segment or a part structure of the preferred bis(alkoxyalkylsilylalkyl)imides/bis(alkoxyalkylsilylalkyl)amides according to the invention Particularly preferable are silyl units with $R^1$=ethoxy or methoxy, $R^2$=methyl or ethyl in combination with $R^4$=H, n=3 and z=0.

Also preferred are silyl units with $R^1$=ethoxy, $R^2$=ethyl in combination with $R^4$=H, n=2 or 3 and z=0.

Particularly preferable are silyl units with $R^1$=ethoxy or methoxy, $R^2$=methyl or ethyl in combination with $R^3$=H, $R^4$=H or carboxyl, n=3, m=2 and z=1 or 2; particularly preferable is $R^1$=ethoxy, $R^2$=ethyl, z=1 and $R^4$=carboxyl.

Also preferred are co-polymerized bis(alkoxyalkylsilylalkyl)imides/bis(alkoxyalkylsilylalkyl)amides, comprising silyl units of the above structure, however with x=0 (i.e. without alkoxy groups), which can serve as "capping ends". Depending on the actual application, this can be of interest for the attainment of smaller polymers.

According to a further preferred embodiment, the bis (alkoxyalkylsilylalkyl)imides contain 5- or 6-membered cyclic imines and/or the bis(alkoxyalkylsilylalkyl)amides contain their open-chain monoamides derived therefrom.

Particularly preferable here are imines which are derived from pyromellitic acid, i.e. imines and amides of the following structure:

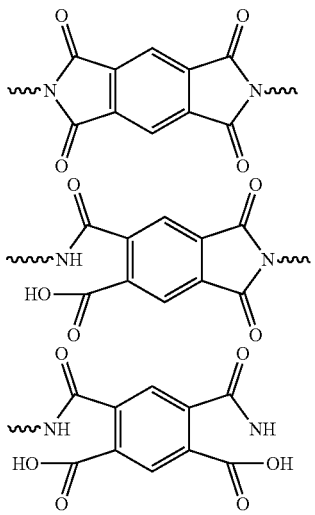

Preferably the bis(alkoxyalkylsilylalkyl)imides/bis(alkoxyalkylsilylalkyl)amides according to the invention have the following structures:

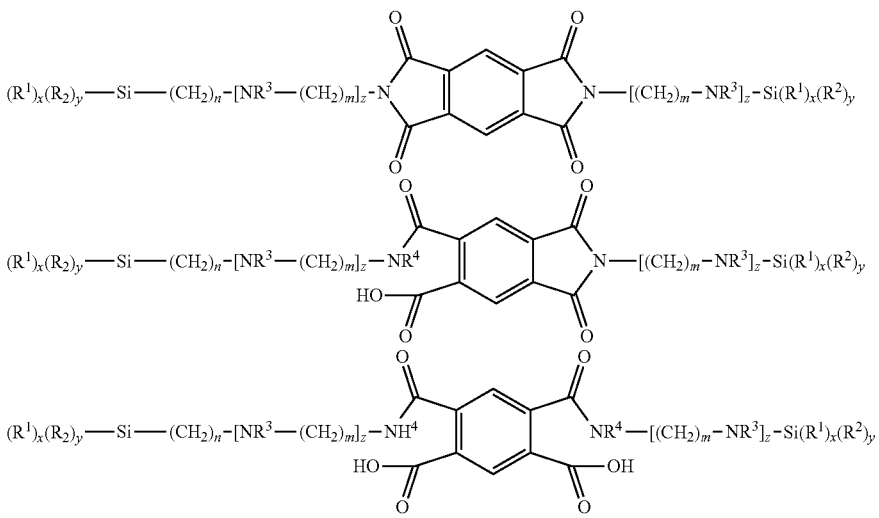

with $R^1$=alkoxyl, preferably linear or branched $C_1$-$C_6$ alkoxyl, still more preferably ethoxy, methoxy, isopropyloxy or propyloxy $R^2$=alkyl, preferably linear or branched $C_1$-$C_6$ alkyl, still more preferably methyl, ethyl, propyl or isopropyl, x=1-3, y=3-x n=1 to 5, preferably 2 or 3 z=0 to 5, preferably 0, 1, or 2

$R^3$=H or trimethylsilyl, wherein for the case that z is >1, each $R^3$ of each unit can be selected independently of one another, m=1 to 5, preferably 2 or 3, wherein for the case that z is >1, each m of each unit can be selected independently of one another, $R^4$=H or trimethylsilyl, particularly preferable is $R^1$=ethoxy or methoxy, $R^2$=methyl or ethyl in combination with $R^4$=H, n=3 and z=0.

Also preferably $R^1$=ethoxy, $R^2$=ethyl in combination with $R^4$=H, n=2 or 3 and z=0.

Particularly preferably $R^1$=ethoxy or methoxy, $R^2$=methyl or ethyl in combination with $R^3$=H, $R^4$=H or carboxyl, n=3, m=2 and z=1 or 2;

still more preferably $R^1$=ethoxy, $R^2$=ethyl, z=1 and $R^4$=carboxyl.

Also particularly preferable are polymerized tetraalkoxysilanes/trialkoxyalkylsilanes/dialkoxyalkylsilanes.

Here the content (in w/w) of tetraalkoxysilanes/trialkoxyalkylsilanes/dialkoxyalkylsilanes based on the bis(alkoxyalkylsilylalkyl)imide/bis(alkoxyalkylsilylalkyl)amides is from >5% to <90% (each based on the educts before the polymerization), particularly preferably >10% to <80% and most preferably from >20% to <70%.

The term "tetraalkoxysilanes/trialkoxyalkylsilanes/dialkoxyalkylsilanes" is in particular understood to mean that one of these components is present but also two or all three. Particularly preferred are a mixture of trialkoxyalkylsilanes and dialkoxyalkylsilanes and a mixture of all three components.

Preferred tetraalkoxysilanes are in particular tetraethoxysilane and tetramethoxysilane, particularly preferably tetraethoxysilane.

Preferred trialkoxyalkylsilanes are in particular triethoxyethylsilane, triethoxymethylsilane, trimethoxyethylsilane and trimethoxymethylsilane, particularly preferably triethoxymethylsilane.

Preferred dialkoxydialkylsilanes are in particular diethoxydiethylsilane, diethoxydimethyl-silane, dimethoxydiethylsilane and dimethoxydimethylsilane, particularly preferably diethoxydimethylsilane.

Particularly preferable are mixtures consisting of (each wt. % based on the total wt. of tetraalkoxysilanes/trialkoxyalkylsilanes/dialkoxyalkylsilanes) containing >0% to <50% tetraalkoxysilanes, >1% to <90% trialkoxyalkylsilanes and >10% to <100% dialkoxyalkylsilanes (wherein the sum of the wt. % contents of course always gives 100%).

The production of such materials is preferably effected by:

a) taking a suitable carboxyl compound, preferably a bisanhydride, b) adding bis(alkoxyalkylsilylalkyl)amine for the production of bis(alkoxyalkyl-silylalkyl)imides/bis(alkoxyalkylsilylalkyl)amides, c) polymerizing the bis(alkoxyalkylsilylalkyl)imides/bis (alkoxyalkylsilylalkyl)amides and d) optionally addition of tetraalkoxysilane/trialkoxyalkylsilane/dialkoxyalkylsilane and subsequent hydrolysis.

As epoxy resins, all known epoxy resins are suitable, as long as they have a temperature stability of at least 160 to 250° C. Examples are bisphenol-based epoxy resins, novolacs, aliphatic epoxy resins and halogenated epoxy resins, with epoxy resins based on bisphenol being preferred.

As inorganic component, organically functionalized alkoxysilanes, titanium alkoxides, optionally mixed with zirconium and/or aluminium alkoxylates, which are chemically coupled with the organic component, are used. The hybrid structures created in this way are characterized in that both during the synthesis, the application and the curing of the material, no separation of the organic-inorganic phase can occur.

It is thus achieved that homogeneous adhesive properties can be ensured. Furthermore, the polymers created act as temperature-stable binders which have a high barrier action against water, aqueous solution and also organic solvents and chemical compositions such as occur in the oil and gas industry. In combination with pigments, fillers or functional additives, combination coatings are accessible which have the following outstanding properties:

no decreased adhesive action in case of a chemically or thermally challenging exposure, the materials also do not swell in contact with solvents or liquid chemical components or delaminate, they present a functional barrier against corrosive media.

By the variation of the quantity ratios, for example 50:50, 45:55, 30:70 or 12:88, of the organic component to the inorganic component, both the thermal stability and also the flexibility of the adhesive created can be purposely adjusted. In this manner, it is possible for those skilled in the art to create tailor-made product properties for a broad application spectrum. Thus, either the thermal and mechanical and the corrosion resistance can come to the fore, and also the flexibility and the corrosion resistance and the compatibility to low alloy steels. Accordingly, through the adjustable layer properties, both broad fields of technology such as the gas and oil industry can be covered and also applications in the field of other media-carrying components and installations and those used for storage and transport.

In a further preferred embodiment, the material used as adhesive consists of one or more (ethanolic/aqueous) inorganic, optionally organically modified sols (b) based on silyl alkoxylates and/or titanium alkoxylates.

Suitable materials are for example described in DE-A 10 2004 001 097 and U.S. Pat. No. 6,162,498.

Such a material is for example obtainable by hydrolysis and polycondensation of one or more silanes of the general formula (I)

$$R_nSiX_{4-n} \tag{I}$$

wherein the groups X are the same or different from one another, hydrolysable groups or hydroxyl groups, the residues R, the same or different from one another, stand for hydrogen, alkyl, alkenyl and alkinyl groups with up to 4 carbon atoms and aryl, aralkyl and alkaryl groups with 6 to 10 carbon atoms and n means 0, 1 or 2, with the proviso that at least one silane with n=1 or 2 is used, or oligomers derived therefrom, optionally in presence of a) at least one compound from the group of the oxides and hydroxides of the alkali and alkaline earth metals and optionally b) added nanoscale $SiO_2$ particles.

Among the above silanes of the general formula (I), there is at least one silane in the general formula whereof n has the value 1 or 2. As a rule, at least two silanes of the general formula (I) are used in combination. In this case, these silanes are preferably used in such a ratio that the average value of n (on the molar basis) is 0.2 to 1.5, preferably 0.5 to 1.0. Particularly preferred is an average value of n in the range from 0.6 to 0.8.

In the general formula (I), the groups X, which are the same or different from one another, are hydrolysable groups or hydroxyl groups. Concrete examples of hydrolysable groups X are halogen atoms (in particular chlorine and bromine), alkoxy groups and acyloxy groups with up to 6 carbon atoms. Particularly preferably alkoxy groups, in particular $C_1$-4 alkoxy groups such as methoxy, ethoxy, n-propoxy and i-propoxy, are used. Preferably the groups X in a silane are identical, wherein methoxy or ethoxy groups are particularly preferably used.

The groups R in the general formula (I), which in the case of n=2 can be the same or identical, are hydrogen, alkyl, alkenyl and alkinyl groups with up to 4 carbon atoms and aryl, aralkyl and alkaryl groups with 6 to 10 carbon atoms. Specific examples of such groups are methyl, ethyl, n-propyl, i-propyl, n-butyl, sec.-butyl and tert.-butyl, vinyl, allyl and propargyl, phenyl, tolyl and benzyl. The groups can have usual substituents, but such groups preferably bear no substituents. Preferred groups R are alkyl groups with 1 to 4 carbon atoms, in particular methyl and ethyl, and phenyl.

According to the invention, it is preferred if at least two silanes of the general formula (I) are used, wherein in one case n=0 and in the other case n=1. Such silane mixtures comprise for example at least one alkyltrialkoxysilane (e.g. (m)ethyltri(m)ethoxysilane) and one tetraalkoxysilane (e.g. tetra(m)ethoxysilane), which are preferably used in such a ratio that the average value of n lies in the above-stated preferred ranges: a particularly preferred combination for the starting silanes of the formula (I) is methyltri(m)ethoxysilane and tetra(m)ethoxysilane.

The hydrolysis and polycondensation of the silane or silanes of the general formula (I) can be performed in presence of at least one compound of the group of the oxides and hydroxides of the alkali and alkaline earth metals. These oxides and hydroxides are preferably those of Li, Na, K, Mg, Ca and/or Ba. Preferably alkali metals, in particular Na and/or K are used. With use of an alkali metal oxide or hydroxide, this is preferably used in a quantity such that the atomic ratio Si:alkali metal lies in the range from 20:1 to 7:1, in particular from 15:1 to 10:1.

The nanoscale $SiO_2$ particles optionally used additionally to the hydrolysable silanes of the general formula (I) are preferably used in a quantity such that the ratio of all Si atoms in the silanes of the general formula (I) to all Si atoms in the nanoscale $SiO_2$ particles lies in the range from 5:1 to 1:2, in particular 3:1 to 1:1.

Nanoscale $SiO_2$ particles are understood to be $SiO_2$ particles with an average particle size (or an average particle diameter) of preferably not more than 100 nm, more preferably not more than 50 nm and in particular not more than 30 nm. For this, for example normal commercial silicic acid products, e.g. silica sols such as the Levasils®, silica sols of Bayer AG, or pyrogenic silicic acids e.g. the aerosil products from Degussa, can be used. The particulate materials can be added in the form of powders and sols. However, they can also be formed in situ during the hydrolysis and polycondensation of the silanes.

The hydrolysis and polycondensation of the silanes can be performed in presence or absence of an organic solvent. Preferably no organic solvent is present. With use of an organic solvent, the starting components are preferably soluble in the reaction medium (which as a rule includes water). Particularly suitable as organic solvents are solvents miscible with water such as for example mono- or polyhydric aliphatic alcohols (such as for example methanol and ethanol), ethers (such as for example diethers), esters (such as for example ethyl acetate), ketones, amides, sulphoxides and sulphones. Apart from this, the hydrolysis and polycondensation can be performed according to the methods familiar to those skilled in the art.

In a further preferred embodiment, the material used as adhesive consists of a composition (a) containing aa) a hybrid material, containing an organic polymer from the group of the polyamides, polyimides and epoxy resins and, covalently bound thereto, an inorganic oligo- or polymer from the group of the oligo- or polysiloxanes or corresponding heterocondensates of Si with Ti, Zr and/or Al, and ab) an inorganic sol based on silyl alkoxylates and/or titanium alkoxylates, wherein hybrid material and sol are crosslinked.

Suitable materials a) and b) are described above.

The crosslinking can be effected physically, for example via hydrogen bridge bonds or, preferably, chemically via covalent bonds.

For the crosslinking of the components aa) and ab), curing is effected, preferably thermally, at temperatures between 100 and 500° C., wherein a temperature between 140 and 250° C. is particularly preferable. During the thermal curing, the desired adhesive is formed via the reaction route sol-gel-solid. Furthermore, by formulation with a suitable encapsulated curing accelerator, the systems described under aa) and ab) can be cured in a chemically controlled reaction regime, which can be initiated by lightly pressing on the substrates to be bonded.

In a further preferred embodiment of the invention, the material used as adhesive d) consists of one or more polyamides, polyimides and/or epoxy resins mixed with oxidic and/or non-oxidic metal and/or metalloid particles, preferably from the group of the oxides, nitrides, carbides and mixtures thereof.

Suitable polymers are described above.

Preferred as oxidic and/or non-oxidic metal and/or metalloid particles are silicon carbide, silicon oxide, silicon nitride, hard materials with SiNAl or SiNC phases, zirconium carbide, zinc oxide and/or aluminium oxide.

Particularly preferred are:

pyrolytically produced $SiO_2$ particles with a hydrophobized surface or hydrophilic surface or mixtures, wherein hydrophobized particles are preferred. (d50=20 nm). Particles with an average particle size between 5 to 8 nm, preferably 5 to 20 nm are suitable, silicon carbide (SiC), preferably with average particle sizes from 0.3 to 4.4 μm such as SiC UF 10 (d50=0.7 μm), ZrC, preferably with an average particle size from 0.5 and 5 μm, particularly preferably 2 μm.

The materials according to the invention a) to d) can be doped with further functional additives and/or pigments. Thus it is possible to incorporate magnetite or other nanoscale magnetic particles. Through the doping of the materials with magnetic particles, it is rendered possible to recognize a layer defect early by suitable analytical methods and repair measures can be instituted before irreparable damage of the protected structure or a total failure of the sealed workpiece occurs.

Further, through the particularly densely crosslinked inorganic crosslinking segments and the low organic content and/or through the incorporation of chemically stable groups such as the imides, outstanding hydrogen sulphide resistance compared to organic systems is achieved. This can be further increased by incorporation of suitable functional groups or pigments.

Furthermore, it is possible to embed nanoscale titanium dioxide into the coating. Through the deliberate doping with titanium dioxide, preferably rutile and/or anatase, particularly in the anatase form, the functionality of the coating is supplemented by photocatalytic self-cleaning. Thereby, the surface can be disinfected or cleaned under UV irradiation.

Furthermore, suitable $H_2$ storage materials such as Zn-based metal-organic frameworks (MoF) can be incorporated. These compounds are a hydrogen store and through the binding of molecular hydrogen can prevent metal embrittlement.

Through the deliberate incorporation of fluorine-containing additives, as for example described in synthesis example D-1, an additional and improved anti-adhesive property of the coating is achieved. The incorporation of the antiadhesive component can take place directly in the synthesis, or be performed as a concluding surface treatment. Here, as well as PTFE particles, in particular fluoroalkyl-modified alkoxy- or chlorosilanes are suitable. Also suitable are polyethylenes such as HDPE.

By suitable additions and processes, a structuring of the surface can be effected. Thereby, the so-called sharkskin effect can be achieved. A significant influence of a surface structuring are improved flow properties of the media passed through the pipe system.

The materials according to the invention are preferably applied at room temperature. In particular, by a suitable spray process uniform layers can be applied, which as well as good adhesive action develop an excellent corrosion protection. The wet film can be applied in one or in several steps, wherein it was found that particularly good films are created when the individual layers and/or intermediate layers do not exceed or fall below a wet film of 2 to 30 μm, preferably 5 to 15 μm.

The drying or the curing of the adhesives applied according to the invention is effected depending on the layer composition, in particular depending on the ratio of the organic and inorganic content, between 100° C. and 350° C., in special embodiments up to 500° C. Surprisingly it was found that for applications which are subject to a thermal stress, a curing of the coating must take place firstly in the application. For such processes, it was found that a brief curing is sufficient, without negatively affecting the properties and lifetime of the coating. As suitable curing methods, as well as discontinuous conventional forced air ovens, flow-through ovens, which allow a continuous curing process, have also proved their worth. In addition, NIR, infrared or ceramic heaters have also been tested as alternative curing methods for flat substrates. Furthermore, the curing can be effected with lasers with a wavelength of 1.2 μm.

The adhesives according to the invention can be applied onto flat substrates in an automated or manual spray process. Furthermore, all wet chemical application processes such as dip-coating, spin-coating and fleece-coating are suitable as application methods for e.g. flat substrates. In addition, it is possible to apply the materials in a free-falling curtain process or other wet coating methods such as blade coating. In order to coat substrates which have a geometry deviating from flat substrates, spray application is in particular suitable. For pipe systems, in particular for the internal coating of the said piping systems, dip-coating and spray-coating are suitable as coating processes. With regard to dip-coating, the required quantity of coating solution can be lowered through an internal pipe introduced into the pipe to be coated. Through the rate with which the coating solution is discharged from the pipe, very precise shift thicknesses can be set. For the application by spray-coating, rotating spray systems, which are passed centred through the pipe and thus enable uniform layer application are in particular suitable. The spraying process should preferably be performed automated, in order to achieve as uniform as possible a layer thickness.

With regard to the adhesive properties of the coating material, a cleaning of the metallic surface should preferably be performed before the application. The cleaning comprises the removal of gross soiling such as dust, and also degreasing. Furthermore, depending on the material to be coated, a basic pretreatment can be advantageous in order to achieve better wetting and wet adhesion of the coating solution on the target substrate.

The coating materials produced according to the synthesis examples presented above can be cured both in a discontinuous forced air oven and also in a continuous thermal process. Alternatively, the curing can be performed with infrared or ceramic heaters. A combination of radiative curing and convective curing has also been found feasible. A considerable advantage of combined curing arises from the shorter process times resulting therefrom compared to a process performed purely convectively.

For one preferred use of the materials as adhesive, a pressure-sensitive curing mechanism was developed. For this, before application the coating material used is mixed with polymer capsules, which can contain substances effective for the condensation and thus the curing of the system applied. The capsules are designed such that at an increased pressure they burst open and release a condensation accelerator.

Further, this method enables the introduction of further active components, which for example can serve for the self-healing of the coating in case of the occurrence of defects. In particular, encapsulated alkoxysilanes such as methyltriethoxysilane and/or tetraethoxy orthosilicate, can be used. Furthermore, organically modified alkoxysilane precursors, which preferably correspond to the general formula $$R'nSiX_{4-x} \tag{II}$$

can be used, wherein X corresponds to a hydrolysable group and R' a residue which is characterized in that no Si—O bond is present. R' can be appropriately substituted with hydrogen or with the following carbon residues: alkyl, aryl, aminoalkyl, mercaptoalkyl, vinyl, acryl, isocyanate.

Furthermore, depending on the precursors, additionally radical polymerization initiators (e.g. dibenzoyl peroxide) can be embedded, which initiate a polymerization of the organic residues.

As condensation accelerators, water, acids, in particular Lewis acids and bases, in particular Lewis bases, can be used encapsulated. Suitable as acids are all acidic amino acids, dilute hydrochloric acid, phosphoric acid or Lewis acids of the form $M^{3+}$ (M=Al, B). As basic compounds, basic amino acids, polyaniline, ammonium hydroxide or further Lewis bases can be used. The released substances have the function of a curing catalyst which accelerates the condensation of the inorganic component so far that within a few minutes the sealing system solidifies completely and attains the required thermal, chemical and mechanical stability.

One advantage of the materials according to the invention consists in that a barrier action is fully achieved at layer thicknesses between 2 μm and 10 μm. From the manufacturing technical viewpoint, a further advantage of the layer systems according to the invention lies in that both flat substrates and also objects with challenging geometries can be coated well. Furthermore, it has been found that the invention allows a broader tolerance towards the layer thickness than comparable materials. Also no higher susceptibility to defects of the layer could be observed at layer thicknesses up to 100 μm. Surprisingly, the same tolerance was also observed with regard to thermal curing. Admittedly, according to the invention a particularly suitable curing process could be determined for the particular materials, however it was found that deviation did not immediately create significantly worse layers.

The materials according to the invention, in particular the composition (a), as well as the use as adhesives, can also be used for the surface sealing of metals, plastics and concrete. In particular, pipe systems manufactured from metals are suitable. Furthermore, the use as surface sealing for the interior of tanks is suitable. This includes both those tanks which are used for the storage of liquids or gases, and also those which are used for the transport of similar media.

In particular, the materials according to the invention are suitable for use, for example as a corrosion protection layer, in media-carrying pipe systems of steel, stainless steel or inconel. They can protect the material against corrosion at room temperature up to a temperature of 500° C. towards liquid or gaseous media, in particular in tank systems in which chemical products are stored or transported.

Furthermore, the materials according to the invention can be used for lining in particular metal or plastic pipes and tanks with a corrosion-protecting and corrosion-protected metal sheet in order to protect corrosion of the pipe system, in particular pipes, connecting pieces, switching points and couplings and in particular storing or transporting systems, in particular tanks, against corrosion.

The invention is explained in more detail by the examples, without thereby limiting it.

EXAMPLES

Materials used:
Fluorolink® DH 10=perfluoropolyether, OH-terminated
L20: epoxy resin based on bisphenol A with a viscosity of 900+−200 mPA*s and an epoxide equivalent of 179+−10 g/equiv.
VE 3261: curing agent based on amino group-containing prepolymers (polyethers, silicones, polyaniline) or di-tri-functional amines
SiC UF-10: silicon carbide (d50=0.7 μm)
$Si_3N_4$ (silicon nitride)
Boron nitride
Aerosil® R 202: pyrolytically produced $SiO_2$ particles with a hydrophobized surface.
Synthetic Procedure A-1:
31.14 g of 4,4'bis(3-aminophenoxy)diphenylsulphone were placed in a suitable reaction vessel and then treated with 2-methylpyrrolidone (NMP). Next, a 4,4''-benzophenone-tetracarboxylic dianhydride suspension (25.78 g) mixed to a paste with NMP was added slowly dropwise. The reaction mixture was stirred for 6 to 8 hrs at room temperature and then treated with 11.2 g of perfluoropolyether (—OH terminated) for hydrophobization. In the last synthesis step, 45.41 g of silicon carbide ($d_{50}$=0.7 μm) in combination with 0.21 g of $SiO_2$ ($d_{50}$=8 nm) were added to the mixture. In order to obtain a homogeneous solution, the polymer dispersion produced was dispersed at 1500 rpm. As a dispersion aid, 10 to 15 g of glass beads were used.

After dispersion, the material can be used for coating purposes. For application, the viscosity can be adjusted by dilution with NMP. It is preferable to perform a brief ultrasound treatment after each dilution.

Synthetic Procedure B-1:

20 g of epoxy resin with a viscosity of 900+−200 mPA*s and an epoxide equivalent of 179+−10 g/equiv. were placed in a reaction vessel and treated with 5 g of isopropoxyethanol. Next, 0.8 g of HDPE and 0.23 g of a hydroxyl group terminated perfluoropolyether were added for hydrophobization. Next, to improve the corrosion protection, 1.6 g of a zinc phosphate pigment and 3.2 g of zinc oxide as filler were added. For further hydrophobization of the layers and to stabilize the corrosion protection pigments, 0.25 g of hydrophobic silicon dioxide ($d_{50}$=8 nm) were added to the reaction solution.

Directly before application, 5 g of polyetheramine were added for the curing. The mixture was dispersed at 15° C. for 60 min and a speed of 2000 rpm, with the aid of glass beads.

To adjust the viscosity, NMP, dioxan or isopropoxyethanol can be used.

Synthetic Procedure 8-2:

20 g of epoxy resin with a viscosity of 900+−200 mPA*s and an epoxide equivalent of 179+−10 g/equiv were placed in a suitable reaction vessel and treated with NMP. The solution was then cooled to 5 to 10° C. Next, 7.4 g of aminopropyldiethoxysilane were added dropwise. After the full quantity of aminopropyldiethoxysilane had been added dropwise and a stable temperature had been reached, 3.4 g of aminopropyltriethoxysilane were added to the system. For formation of the polysilsesquioxane network, 5.8 ml of a 0.1 molar HCl were slowly added dropwise. The rate at which the hydrochloric acid required was added dropwise was set such that the temperature did not exceed 35° C.

The material can then be used for coating purposes. For application, the viscosity can be adjusted by dilution with short-chain alcohols, xylene, DMF or dioxan.

Synthetic Procedure B-2:

20 g of epoxy resin were placed in a reaction vessel, treated with NMP and cooled to 5 to 10° C. Next, 7.4 g of aminopropyldiethoxysilane were added dropwise. After the complete quantity of aminopropyldiethoxysilane had been added dropwise and a stable temperature had been reached, 3.4 g of aminopropyltriethoxysilane were added to the system. To form the polysilsesquioxane network, 3.2 ml of a 0.1 molar HCl is slowly added dropwise. The rate at which the hydrochloric acid required was added dropwise was adjusted such that the temperature did not exceed 35° C.

In a second preparation, 20 ml of methyltriethoxysilane and 6 ml of tetraethoxysilane were placed in a reaction vessel and treated with 2.5 ml of a 1 N hydrochloric acid with stirring at room temperature. After addition of the hydrochloric acid, within 5 minutes a clear sol was formed with strong heat evolution. After the reaction mixture had cooled to room temperature, the sol created in preparation 2 was slowly blended with the alkoxysilane-modified epoxy resin.

The material can then be used for coating purposes. For application the viscosity can be adjusted by dilution with short-chain alcohols, xylene, DMF or dioxan.

Synthetic Procedure C-1:

1.5 mol of pyromellitic dianhydride were placed in a suitable reaction vessel and made into a paste with 80 g of ethanol. Next, the heterogeneous solution was cooled to ca. 5° C. 1.5 mol of aminopropyltrieethoxysilane were slowly added dropwise to the mixture. After ca. 30 minutes, a clear solution resulted. Next, the reaction solution was slowly warmed to room temperature.

The material can then be used for coating purposes. For application the viscosity can be adjusted by dilution with short-chain alcohols, xylene, DMF, dioxan etc.

Synthetic Procedure C-2

1.5 mol of pyromellitic dianhydride were placed in a suitable reaction vessel and made into a paste with 80 g of ethanol. Next, the heterogeneous solution was cooled to ca. 5° C. A mixture of 0.70 mol of aminopropyltriethoxysilane and 0.8 mol of aminopropyldiethoxy-silane was slowly added dropwise to the mixture. After ca. 30 minutes a clear solution was formed. Next, the reaction solution was slowly warmed to room temperature. The reaction mixture was stirred at room temperature for 6 to 8 hrs and then treated with 5.8 g of alkoxysilane modified perfluoropolyether for the hydrophobization. In the last synthesis step, 15 g of silicon carbide were added to the mixture. In order to obtain a homogenous solution, the polymer dispersion obtained was dispersed at 1500 rpm. 10 to 15 g of glass beads were used as a dispersion aid.

The material can then be used for coating purposes. For application the viscosity can be adjusted by dilution with short-chain alcohols, xylene, DMF or dioxan.

Synthetic Procedure D-1

20 ml of the coating solution produced according to DE 102004001097 B4 were placed in a round-bottomed flask. 30 ml of the materials synthesized on the basis of C1-C2 were slowly added dropwise to this. After a stirring phase of two hours at room temperature, the system could be used as hybrid material for coating and bonding purposes.

The invention claimed is:

1. The use of one or more materials from the group consisting of
   a) one or more hybrid materials containing an organic polymer from the group of the polyamides, polyimides and epoxy resins and an inorganic oligo- or polymer from the group of the oligo- and polysiloxanes and heterocondensates of Si with Ti, Zr and/or Al, wherein the organic and the inorganic component are covalently bound to one another, in combination with one or more ethanolic or aqueous inorganic sols based on silyl alkoxylates, wherein hybrid material and inorganic sol are crosslinked, and
   b) one or more hybrid materials containing an organic polymer from the group of the polyamides and polyimides and an inorganic oligo- or polymer from the group of the oligo- and polysiloxanes and heterocondensates of Si with Ti, Zr and/or Al, wherein the organic and the inorganic component are covalently bound to one another,
   as adhesive for the bonding of metals, plastics, concrete and/or ceramics,
   wherein the silyl alkoxylate is a silane of the general formula (I)

$$R_n SiX_{4-n} \qquad (I)$$

wherein the groups X are the same or different from one another, hydrolysable groups or hydroxyl groups, the residues R, the same or different from one another, stand for hydrogen, alkyl, alkenyl and alkinyl groups with up to 4 carbon atoms and aryl, aralkyl and alkaryl groups with 6 to 10 carbon atoms and n means 0, 1 or 2, with the proviso that at least one silane with n=1 or 2 is used.

2. The use according to claim 1, wherein one or more materials from the group a) are used.

3. The use according to claim 1, wherein the adhesive contains encapsulated curing accelerators.

4. The use according to claim 1, wherein the adhesive is doped with magnetic nanoparticles, wherein the doping serves to detect flaws or defects of the adhesive layer.

5. The use according to claim 1, wherein the adhesive contains one or more fluorine-containing additives.

6. The use according to claim 1, wherein the adhesive contains conduction sensors, which after the application enable detection of flaws.

7. The use according to claim 1, wherein the adhesive contains encapsulated polymerization initiators and encapsulated alkoxysilane precursors, which on the occurrence of defects after the application serve for self-healing.

8. The use according to claim 1, wherein the adhesive is applied in media-carrying pipe systems of steel, stainless steel or inconel.

9. The use according to claim 1, wherein the adhesive serves to line metal or plastic pipes, concrete pipes or tanks with a corrosion-protected metal film.

10. A method for the bonding of two substrates with metal, plastic, concrete and/or ceramic surfaces, wherein one or more adhesives from the group consisting of
   a) one or more hybrid materials containing an organic polymer from the group of the polyamides, polyimides and epoxy resins and an inorganic oligo- or polymer from the group of the oligo- and polysiloxanes and heterocondensates of Si with Ti, Zr and/or Al, wherein the organic and the inorganic component are covalently bound to one another, in combination with one or more ethanolic or aqueous inorganic sols based on silyl alkoxylates, wherein hybrid material and inorganic sol are crosslinked, and
   b) one or more hybrid materials containing an organic polymer from the group of the polyamides and polyimides and an inorganic oligo- or polymer from the group of the oligo- and polysiloxanes and heterocondensates of Si with Ti, Zr and/or Al, wherein the organic and the inorganic component are covalently bound to one another, are applied onto at least one metal, concrete or ceramic surface of at least one substrate and the two substrates are thereafter joined together,
wherein the silyl alkoxylate is a silane of the general formula (I)

$$R_nSiX_{4-n} \quad (I)$$

wherein the groups X are the same or different from one another, hydrolysable groups or hydroxyl groups, the residues R, the same or different from one another, stand for hydrogen, alkyl, alkenyl and alkinyl groups with up to 4 carbon atoms and aryl, aralkyl and alkaryl groups with 6 to 10 carbon atoms and n means 0, 1 or 2, with the proviso that at least one silane with n=1 or 2 is used.

11. The method according to claim 10, wherein a metal surface is bonded with a metal or plastic surface.

12. The method according to claim 10, wherein the adhesive develops its adhesive action through pressing and cures dimensionally stably through pressure.

13. A composition containing
   ca) a hybrid material, containing an organic polymer from the group of the polyamides, polyimides and epoxy resins and, covalently bound thereto, an inorganic oligo- or polymer from the group of the oligo- or polysiloxanes or corresponding heterocondensates of Si with Ti, Zr and/or Al, and
   cb) an ethanolic or aqueous inorganic sol based on silyl alkoxylates,
wherein hybrid material and sol are crosslinked,
wherein the silyl alkoxylate is a silane of the general formula (I)

$$R_nSiX_{4-n} \quad (I)$$

wherein the groups X are the same or different from one another, hydrolysable groups or hydroxyl groups, the residues R, the same or different from one another, stand for hydrogen, alkyl, alkenyl and alkinyl groups with up to 4 carbon atoms and aryl, aralkyl and alkaryl groups with 6 to 10 carbon atoms and n means 0, 1 or 2, with the proviso that at least one silane with n=1 or 2 is used.

14. The composition according to claim 13, containing fluorine-containing additives for the establishment of an antiadhesive surface.

15. The composition according to claim 13, containing titanium dioxide for obtention of a self-cleaning effect under UV irradiation.

16. The use of a composition according to claim 13 as sealing material and/or corrosion protection layer.

17. The use according to claim 1, wherein one or more materials from the group b) are used.

* * * * *